(12) United States Patent
Lea

(10) Patent No.: US 8,441,926 B2
(45) Date of Patent: May 14, 2013

(54) METHOD AND SYSTEM FOR A NOVEL FLOW ADMISSION CONTROL FRAMEWORK

(75) Inventor: Chin Tau Lea, Ma On Shan (HK)

(73) Assignee: The Hong Kong University of Science and Technology, Kowloon (HK)

( * ) Notice: Subject to any disclaimer, the term of this patent is extended or adjusted under 35 U.S.C. 154(b) by 614 days.

(21) Appl. No.: 11/949,008

(22) Filed: Nov. 30, 2007

(65) Prior Publication Data

US 2009/0141624 A1 Jun. 4, 2009

(51) Int. Cl.
*H04J 1/16* (2006.01)
(52) U.S. Cl.
USPC ............................ 370/230; 370/235; 370/236
(58) Field of Classification Search .................. 370/230, 370/232, 235, 236, 252
See application file for complete search history.

(56) References Cited

U.S. PATENT DOCUMENTS

| | | | | |
|---|---|---|---|---|
| 6,006,269 | A * | 12/1999 | Phaal | 709/227 |
| 6,118,791 | A * | 9/2000 | Fichou et al. | 370/468 |
| 6,330,226 | B1 * | 12/2001 | Chapman et al. | 370/232 |
| 6,728,213 | B1 * | 4/2004 | Tzeng et al. | 370/235 |
| 7,221,656 | B1 * | 5/2007 | Aweya et al. | 370/252 |
| 2004/0059827 | A1 * | 3/2004 | Chiang et al. | 709/235 |
| 2004/0213265 | A1 * | 10/2004 | Oueslati et al. | 370/395.42 |
| 2006/0002297 | A1 * | 1/2006 | Sand et al. | 370/235 |
| 2006/0176809 | A1 | 8/2006 | Lea et al. | |
| 2007/0076615 | A1 | 4/2007 | Lea et al. | |
| 2007/0149186 | A1 * | 6/2007 | Barbosa da Torre et al. | 455/423 |
| 2010/0172349 | A1 * | 7/2010 | Konda | 370/390 |
| 2012/0087241 | A1 * | 4/2012 | Sand et al. | 370/230 |
| 2012/0195204 | A1 * | 8/2012 | Patel et al. | 370/237 |

OTHER PUBLICATIONS

R. Braden, D. Clark, and S, Shenker, "Integrated Services in the Internet Architecture: An Overview," RFC 1633, Jun. 1994.
S. Blake et. al., "An Architecture for Differentiated Services," RFC2475, Dec. 1998.
L. Roberts, "The next generation of IP—flow routing," SSGRR 2003, L'Aquila Italy, Jul. 2003.
Caspian Networks introduces Apeiro flow-based router for service provider networks, downloaded: http://www.hoise.com/primeur/03/articles/monthly/AE-PR-05-03-36.html.
Z. Zhang, Z. duan, L. Gao and V. Ho., "Decoupling QoS Control from Core Routers: A Novel Bandwidth Broker Architecture for Scalable Support of Guaranteed Services," Proc, ACM SIGCOMM, Aug./Sep. 2000.
K. Mase, "Toward scalable admission control for VoIP networks,"IEEE Communications Magazine, p. 42-47, Jul. 2004.

(Continued)

*Primary Examiner* — Andrew Lee
(74) *Attorney, Agent, or Firm* — Turocy & Watson, LLP

(57) ABSTRACT

This invention presents a new FAC framework that keeps the stateless property of the Internet, allows statistical multiplexing gains, and is capable of handling admission control of both TCP and UDP flows.
One of the key inventions of the patent is the solution for the signaling/data path divergence problem inherent in a session layer FAC scheme. The solution consists of two components. First, we keep the paths in the network symmetric (i.e. the forward and the backward path are the same) so that we only need to monitor SETUP packets in new flow detection. Second, we select either a tree or a nonblocking mesh topology for the network. Various topologies for constructing nonblocking networks for the proposed FAC architecture are also disclosed.

20 Claims, 8 Drawing Sheets

OTHER PUBLICATIONS

Mykoniati, C. et al., "Admission Control for Providing QoS in DiffServ IP Networks: The TEQUILA Approach," IEEE=2 0Communications Magazine, pp. 38-44, Jan. 2003.

C. Dovrolis, P. Ramanathan, and D. Moore, "What do packet dispersion techniques measure?"in IEEE Infocom'01, 2001.

R. Kapoor, L.-J Chen, L. Lao, M. Gerla, and M. Y. Sanadidi,"CapProbe: a simple and accurate capacity estimation technique," SIGGOMM Comput. Commun. Rev., vol. 34, No. 4, pp. 67-78, 2004.

I. M. Ivars and G. Karisson, "PBAC: Probe-Based Admission Control,"Proc. QoFIS 2001, 2001, pp. 97-109.

* cited by examiner

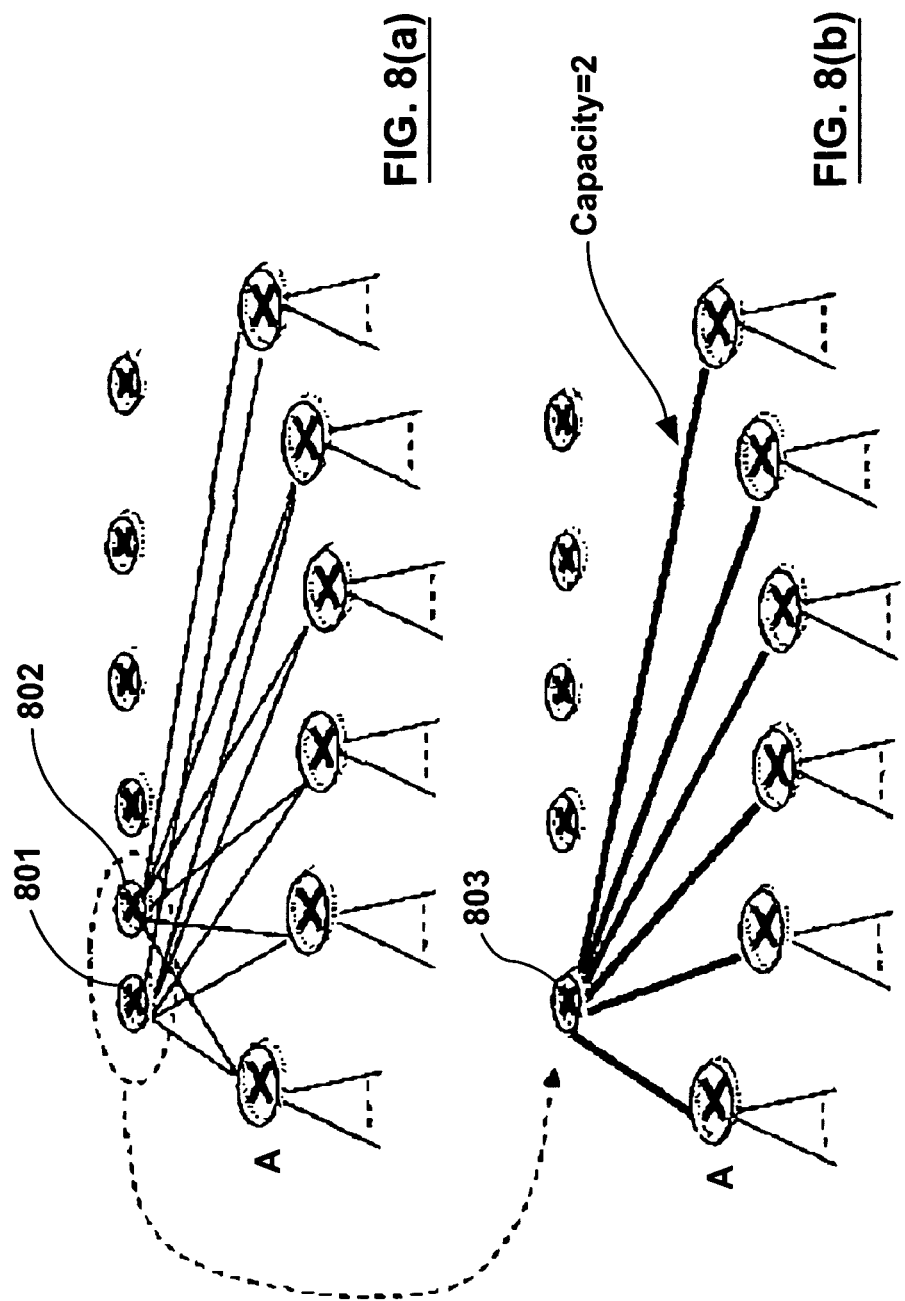

METHOD AND SYSTEM FOR A NOVEL FLOW ADMISSION CONTROL FRAMEWORK

CROSS-REFERENCE TO RELATED APPLICATIONS

This application is related to U.S. Application entitled "Non-Blocking Internet Backbone Network," filed on Oct. 3, 2005, with Ser. No. 11/243,117, and the entire disclosure of which is herein incorporated by reference.

This application is also related to U.S. Application entitled "Non-Blocking Destination-Based Routing Networks," with Ser. No. 11/556,165, filed on Nov. 2, 2006, and the entire disclosure of which is herein incorporated by reference.

BACKGROUND

1. Field of the Invention

This invention relates to techniques for a flow admission control framework for a developed Internet. In particular, it relates to a method and system for building an admission control framework that keeps the stateless property of the Internet, allows statistical multiplexing gains, and handles admission control of both TCP and UDP flows.

2. Description of Related Art

Internet Protocol ("IP") networks are traditionally designed to support best-effort services, with no guarantees for reliable and timely delivery of packets. With the migration of what has become the ubiquitous transport network to data as well as real-time applications like voice and video, the Internet needs to provide quality of service ("QoS") as predictably as conventional circuit switching networks. Although some QoS capabilities in an isolated environment have been demonstrated, providing end-to-end QoS at a large scale across the Internet remains an unsolved problem.

Many data-plane techniques, such as scheduling and classification, have been invented to reduce delay and delay jitters. But data plane components are not enough to solve the problem. If the total amount of data entering the Internet exceeds the amount the network can sustain, no methods can guarantee the QoS. The general consensus is that, besides data plane components, flow admission control ("FAC") must be implemented to deliver hard QoS in the Internet.

One of the key issues in the design of the QoS Internet is to decide between a stateful and a stateless network. Differentiated Services ("DiffServ") is a stateless approach. DiffServ keeps per-flow information only at the edge of a network, but it uses class-based scheduling and buffering priorities in the core of the network. Without FAC, DiffServ can only provide "soft" QoS (probabilistic QoS) guarantees where one class of traffic receives relatively better service than other classes. Some measurement-based FAC schemes have been proposed to enable access routers to send out ping-like probing packets to measure the end-to-end delay, or even available bandwidth of the path before admitting a flow. It is doubtful, however, that hard QoS can be supported with this approach due to its inherent limitations—delay is not useful and the accuracy for bandwidth measurement is not high enough to support hard QoS guarantee.

Bandwidth broker (BB) is a stateful approach. In practice, a BB often morphs into a soft switch. The Resource Admission Control Subsystem ("RACS") of the Next Generation Network ("NGN") architecture is such an example. It stores the entire topology of the network, collects session-layer signaling messages (such as Session Initiation Protocol "SIP" and H.323), and updates the link state database according to the bandwidth used for each flow. Because the RACS stores the topology and tracks the bandwidth utilization of each link under its control, it does not need to exchange link state updates with routers in the network. There are many problems with this approach, some of which are discussed below:

1. It is too slow for TCP flows° FAC. Sending setup packets to the RACS does not work in this case as the flow admission decision must be made immediately upon the arrival of a TCP flow's first packet.
2. The RACS does not communicate with routers about a link's current utilization status; thus, the RACS needs to perform strict resource reservation for each flow. This means that RACS can not easily reap statistical multiplexing gains of a packet network.
3. If a discrepancy between the database of the RACS and the real bandwidth consumed exists, either the bandwidth will be lost or the network will be over utilized and will experience congestion.
4. A centralized device creates a single-point failure problem.
5. Inter-operability can be a problem as different domains have different ways to implement the bandwidth broker.

Flow aware routers are another stateful approach. A flow-aware router stores the state information of each flow and performs bandwidth reservation (based on the RSVP and the InteServ model) and admission control accordingly. When a new flow arrives, an entry in the state table is created. If we use a soft-state approach, the entry will be removed after a certain period of time. Detecting a new TCP flow can be easily conducted at the transport layer (SYN=1, ACK=1); however, detecting a new UDP flow is not as easy. In some references in the field, this is done by checking whether a UDP packet's four-tuple address (source IP, source port, destination IP, destination port) is in the state table 101, shown in FIG. 1. If not, a new entry will be created in the state table 101.

This approach transforms the Internet from a stateless into a stateful network. Cost and scalability are some obvious problems. A large amount of fast memory is required for storing the states of millions of flows. The link rate has now reached 40 Gbps (OC768). It is not clear if storing states of each flow is even feasible for such high-rate routers. But economical issues aside, this approach suffers from another serious problem: detecting UDP flows at the transport layer makes routers vulnerable to denial-of-service (DOS) attacks. Hackers can just send in as many UDP datagrams as possible. Because each flow contains one packet, the router will be swamped with the task of setting up and tearing down the UDP single-packet flows. The networks can be brought down easily accordingly.

The above discussion shows that performing FAC for UDP flows at the transport layer make the network vulnerable to DoS attacks. In this invention, we propose a new FAC architecture where UDP flows' FAC will be done at the session layer. Flows are established through setup packets. When a link along the path of an incoming setup packet is congested, a router will block the setup packets to prevent new flows from being added to the network. Thus path setup packets also serve the function of probing the congestion status of the network. However, FAC is not as simple as it appears. There are several factors contributing to the difficulties of FAC in the Internet. One is that FAC needs to be support both TCP flows and UDP flows. While TCP flows can be identified at the transport layer, UDP flows can only be identified in session layer protocols, such as SIP and H.323. This presents a difficult problem. Referring to FIG. 3, the signaling path, the solid lines linking Client A 325 to Edge Router 310 to Edge Router 335 to Signaling Server C 315, and linking Client B to Edge Router 301 to Edge Router 335, is different from the data path, the broken lines linking from Edge Router 310 to Edge Router 305 to Edge Router 301. Thus the status of the signaling path may not reflect the congestion status of the data path. The probing performed by setup packets can not guarantee the QoS of the data paths of UDP flows.

SUMMARY

Novel methods, apparatus, and system are presented to solve the above-identified problems. The basic premise is that QoS will only be guaranteed to premium-class TCP and UDP flows in the network. We will therefore limit our discussion to the premium-class traffic as traffic of lower-priority classes cannot not interfere with the performance of the premium traffic regardless of their amount. Unlike the flow-aware-router approach, QoS is guaranteed in this novel framework not by per-flow bandwidth reservation, but by controlling the admission of new flows. The objectives of the proposed FAC framework are the following:

1. The FAC scheme should handle both UDP and TCP flows.
2. The FAC scheme should keep the stateless property of the Internet.
3. The FAC approach should allow statistical multiplexing gains.

This invention uses flow setup messages to probe the congestion status of the traversing of a flow. If a link's utilization exceeds a pre-set threshold, all flow setup messages will be dropped by the router controlling that link. An Internet Control Message Protocol ("ICMP") packet is sent back to inform the sender of the setup message. In this invention, TCP flows' FAC is done at the transport layer, but UDP flows' FAC is done at the session layer. By preventing overflow of each link in the network, the QoS of all existing flows will be guaranteed.

BRIEF DESCRIPTION OF THE DRAWINGS

FIGS. 8(a) and 8(b) are schematic representation of yet another alternative typology of FIG. 5 where two nodes are combined into one.

Like reference numbers and designations in the different figures indicate like elements.

DETAILED DESCRIPTION

This invention involves the novel design of a flow admission control framework. In this invention, the method and the system for the framework involve detecting flows, using a tree network typology, and/or using a non-blocking network with several possible topologies.

The invention will be illustrated in conjunction with illustrative embodiments of a network and its associated nodes and routers. It should be understood, however, that the invention is not limited to use with the particular network system or node implementation described, but is instead more generally applicable to tree topology and non-blocking networks.

Figure 2A:
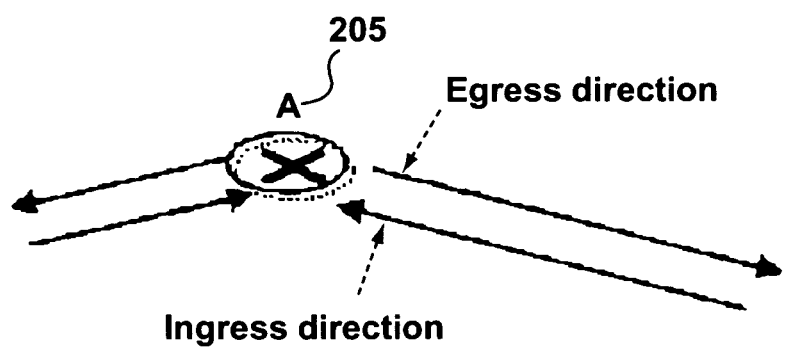
FIG. 2(a) is a schematic representation of the blocking by router A for each direction of a link.
Figure 2B:
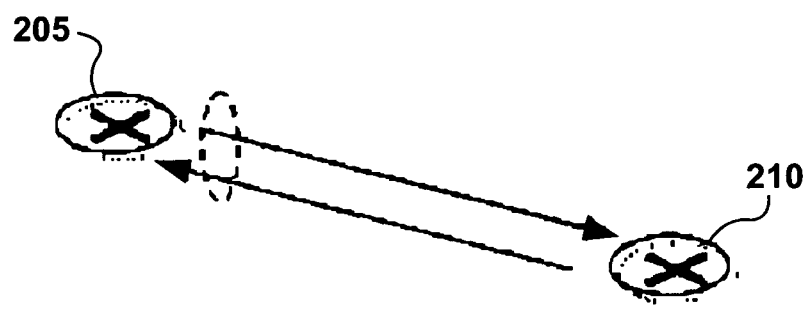
FIG. 2(b) is a schematic representation of the blocking by router A in a network with symmetric paths.

Referring to FIGS. 2(a) and 2(b): FIG. 2(a) is a schematic representation of the blocking by router A for each direction of a link. For each direction, we need to block both setup and ACK packets if traffic sent through that direction is congested. FIG. 2(b) is a schematic representation of the blocking by router A in a network with symmetric paths. Whenever one direction is congested, we need to block both directions of that link. This way, blocking ACK packets will sufficA link is bidirectional.

More specifically, referring to FIG. 2(a), the egress direction is the one incident from Router A (205), and the ingress direction is incident into Router A (205). FAC is usually performed for each direction separately. A flow may also be bidirectional; the forward and backward paths may not go through the same router. Consider the routers for performing the transport and session layer FAC. Each router link has two meters to measure the current link utilization: one for ingress and one for egress. A threshold is set for each meter. When the ingress (egress) threshold is exceeded, flows of the ingress (egress) direction will be blocked. For each direction, flows are established through two types of packets: flow SETUP packets or flow ACK packets. For a router, allowing a SETUP or an ACK packet traveling along the ingress (egress) means the same thing: a flow passing through that direction will be established. So when the ingress (egress) direction is flow controlled, we need to block both SETUP and ACK packets of the ingress (egress) direction. But identifying both SETUP and ACK packets at the session layer protocol is a complicated task as there are many types of ACKs involved.

One way to simplify the processing is to identify only the SETUP packets. Referring to FIG. 2(b), this is done by keeping the paths symmetric (i.e. forward and backward paths are the same). If the forward and the backward path of a flow are the same, which is usually the case with many networks, a setup packet and its associated ACK will pass through the same link interface, in opposite direction. Since a flow is bidirectional, we can just block the setup packets of both directions whenever one direction is congested. This means that we only need to detect the setup packets for FAC. This is important for session layer FAC as there are several types of ACKs involved in flow setup and blocking the ACK of a SIP flow is more complicated than blocking a setup packet.

Figure 1:
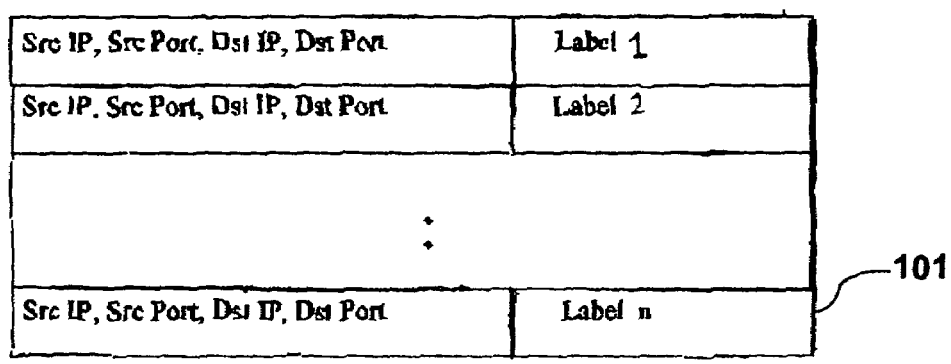
FIG. 1 is a schematic representation of the state table of four-tuples of all established UDP flows at an access router.

There may be a problem if UDP packets which have not gone through the setup procedure are sent. To prevent this, we can use access routers to block these types of packets. An access router will store the four-tuples—source IP, source port, destination IP, destination Port—of all established flows, as shown in Table 101 in FIG. 1. Because the number of established flows at an access router is quite limited, the cost of this approach is low. When a new UDP packet arrives, the packet will be checked against the existing flow entries inside Table 101. If the four-tuple of an incoming packet does not match any entry, then we check if the packet is a session-layer SETUP packet. If not, the packet will be thrown away. Other routers inside the network need not perform the same checking. They only need to check if the packet is a SETUP packet when FAC is turned on.

The new architecture allows statistical multiplexing. Flow admission is determined by the current total link utilization. Suppose there are $10^4$ flows passing through a 2 Gbps link and each flow requires a bandwidth of 200 Kbps. If we reserve the bandwidth individually, we need to set aside 2 Gbps. After this, any new flow will be blocked. But the combined link utilization of the $10^4$ flows at any moment may only be 1 Gbps and more flows can be admitted to the network. This is called statistical multiplexing gain—a major advantage of a packet network. The new architecture does not reserve bandwidth for each individual flow. Instead, the FAC is based on the total link utilization. Thus the new FAC architecture can easily reap the statistical multiplexing gains of a packet network.

Network Topologies

Figure 3:
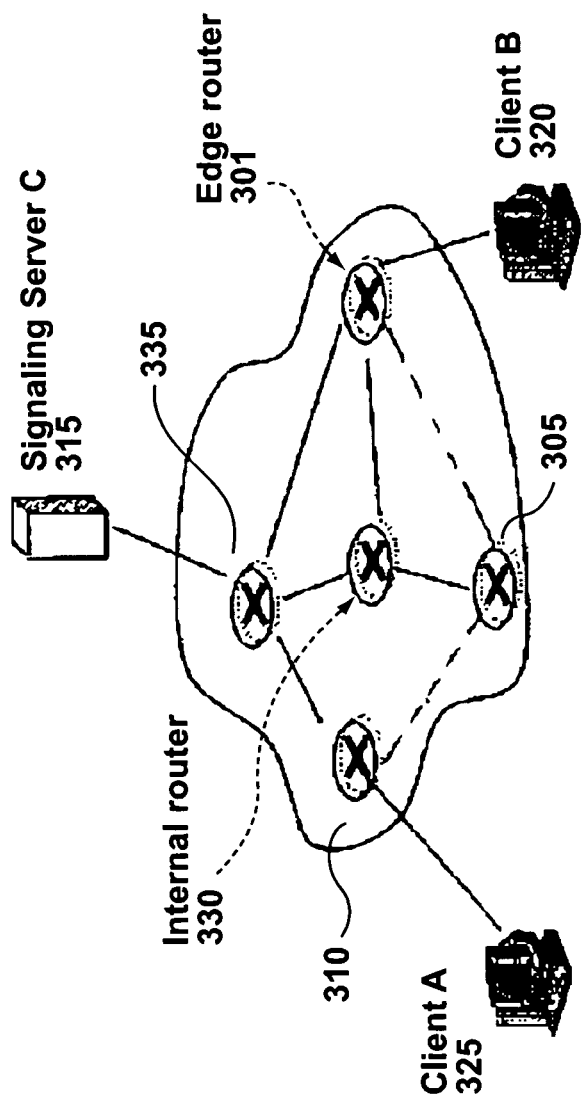
FIG. 3 is a schematic representation illustrating the signaling paths and data paths in a mesh topology

In this invention, UDP flows' FAC is done at the session layer. But session layer FAC presents a difficult problem: the signaling path and data path may be different, referring again to FIG. 3. Given the difference, the status of the signaling path may not reflect the congestion status of the data path. The probing performed by setup packets can not guarantee the QoS of the data paths of UDP flows.

Tree

Figure 4:
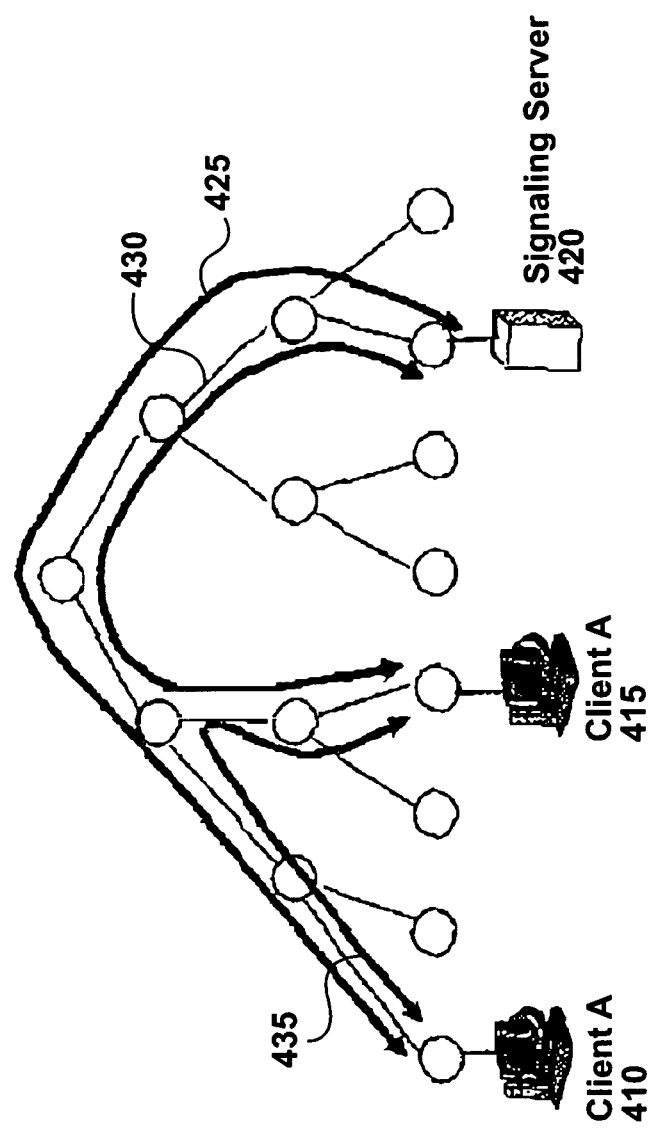
FIG. 4 is a schematic representation of signaling paths and data paths in a tree typology.

There are two solutions to this problem below. One is to choose a tree as the network topology, as shown in FIG. 4. Assume Client A (410) sends a session layer path setup packet to Signaling Server C (420) along Path 425. The Signaling Server 420 then sends a setup packet to Client B (415) along Path 430. If both transmissions are successful, the two setup packets will not be blocked. This means that the two signaling paths 425 and 430 are congestion free. It is easy to see that the data path 435 between Client A 410 and Client B is a subset of the union of the two signaling paths 425 and 430. Thus the data path 435 must be congestion free.

Non-Blocking Networks (NBNs)

Figure 5A:
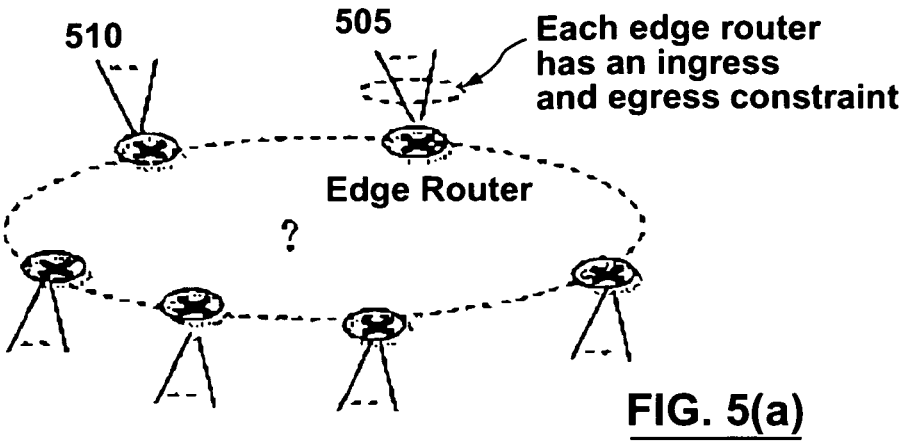
FIG. 5(a) is a proposed non-blocking network typology with n edge routers.
Figure 5B:
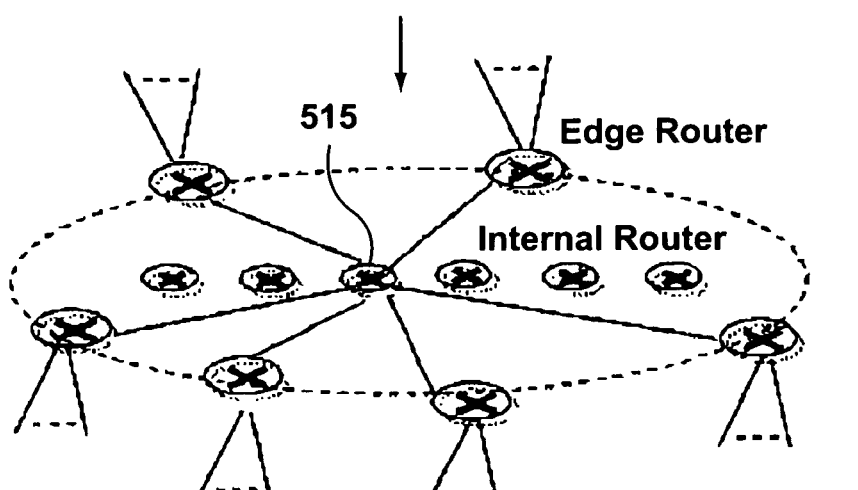
FIG. 5(b) is schematic representation of the network of FIG. 5(a) with n added internal routers.
Figure 5C:
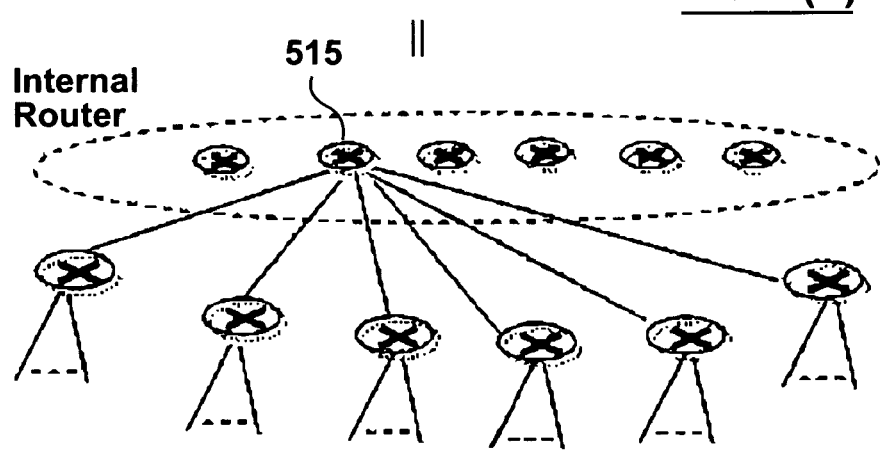
FIG. 5(c) is another way of drawing the schematic representation of the network of FIG. 5(b).

The second solution is to use a non-blocking network ("NBN"). Referring to FIG. 5(*a*), an edge router 505 or 510 is a router that interfaces with outside customers, a customer being, for example, another internet service provider ("ISP") or another portion of the same ISP, or clients. An internal router mainly routes traffic and does not interface with the outside world. In a non-blocking network, an edge router has a specified amount of traffic for entering and for leaving the backbone network. For example, Edge Router 505 has specified amounts of the ingress and egress constraints associated with it.

When a flow enters a network from an edge router and leaves the network through another edge router, then entry router is called the ingress router and the exit router is called egress router of the flow. A network is called non-blocking if it can accept a flow as long as its ingress router and egress router have capacity to accept the flow (i.e. adding the flow will not exceed the constraint of the ingress and egress routers). In other words, as long as the ingress and egress traffic amounts do not exceed some specified thresholds, none of its internal links will experience congestion.

If we use a NBN, then only the ingress and the egress routers need to perform FAC. Internal routers need not involve in a FAC decision. For example in FIG. 3, if a SETUP packet is sent from Client A 325 to the Signaling Server C 315, and Server 315 forwards the SETUP packet to client B 320. If the SETUP packet can reach 315 from A 325, and B 320 from C 325, it means that all edge routers connected to A 325, B 320, and C 315 are congestion free. Thus both A 325 and B 320 are congestion free. By the definition of NBN, all internal paths will be congestion free after adding this flow between A 325 and B 320. NBN, as discussed above, can solve the problem that the signaling path and the data path are different in session-layer FAC.

An NBN must be designed such that its internal links will never experience congestion as long as the ingress and egress amount of each edge router do not exceed the specified constraints. Some design examples are shown below:

The first NBA topology is given in FIG. 5(*a*)-5(*c*). Suppose there are n edge routers, including routers 510 and 505. We can put n internal routers, such as internal router 515, and each edge router has one link connected to each internal router. Such connections between edge routers and internal router 515 are shown in FIG. 5(*b*). Additional details are given below.

1. All n edge routers have the same configuration. When an external packet arrives, an edge router will first evenly distribute the packets to all n internal routers. The distribution can be based on the four-tuple of the IP header described previously. Packets of the same flow will not be transmitted out of sequence.
2. When an internal router receives a packet from an edge router, it will route the packet to its destination edge router. The routing can be based on MPLS labels or IP addresses.

It can be easily shown that this network is an NBN. If the internal link is 1, and then the amount of ingress and egress traffic constraint of an edge router will be n. Thus if we set the ingress and egress thresholds to n, none of its internal links will experience congestion regardless of the destination of each packet.

Figure 6:
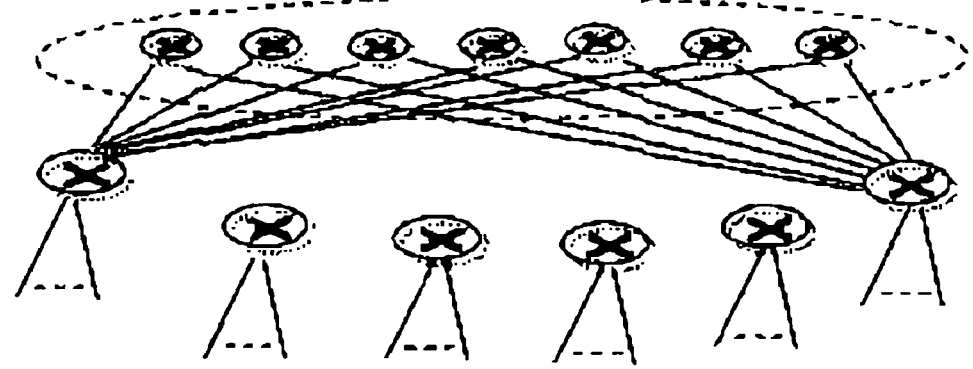
FIG. 6 is schematic representation of the network typology of FIG. 5 with additional routers.

In the following we describe four important variations of the basic scheme described in FIG. 5(*a*)-FIG. 5(*c*). The first variation is to use (n+1) internal router as shown in FIG. 6 (each router has n links). Each edge router in this configuration has (n+1) links, one connected to each internal router. In this arrangement, the ingress and egress traffic constraint will be increased to (n+1). However, we will limit the value to n only. When one internal node fails, the network will lost capacity of 1. The remaining capacity n is still large enough to support all traffic admitted to the network. An obvious variation of the scheme is to have (n+2) routers to achieve a higher degree of fault tolerant capability.

Figure 7:
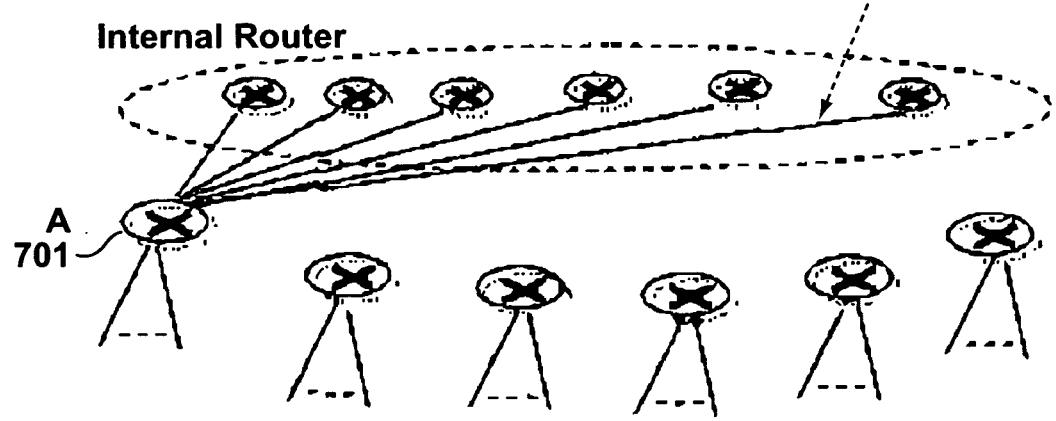
FIG. 7 is another alternative schematic representation of the same typology of FIG. 5.

The second variation is to use different link capacities for different edge routers. But all links from one edge router must be the same. For example, in FIG. 7 edge router A 701 will use a link capacity of 1.2 for each of its link. This way the admissible ingress and egress traffic amounts (i.e. ingress and egress traffic constraint) of router of A 701 will be 1.2 times that of other edge routers. The NBN property of the network is not changed by this. Another edge router can use a different link capacity, say, 1.5, and its ingress and egress admissible traffic amounts will be 1.5 times larger than those routers using link capacity of 1.

The third variation is that several internal routers can be combined into a larger internal router, as shown in FIG. 8. This will reduce the number of internal routers, although the capacity requirement will be increased. Referring to FIG. 8(*a*), two internal routers 801 and 802 are replaced with one router 803 in FIG. 8(*b*) and the capacity of each link connected to the new router will be 2, twice as large as before. The distribution of the load will be proportional to the link capacities connected to each internal router.

Figure 9A:
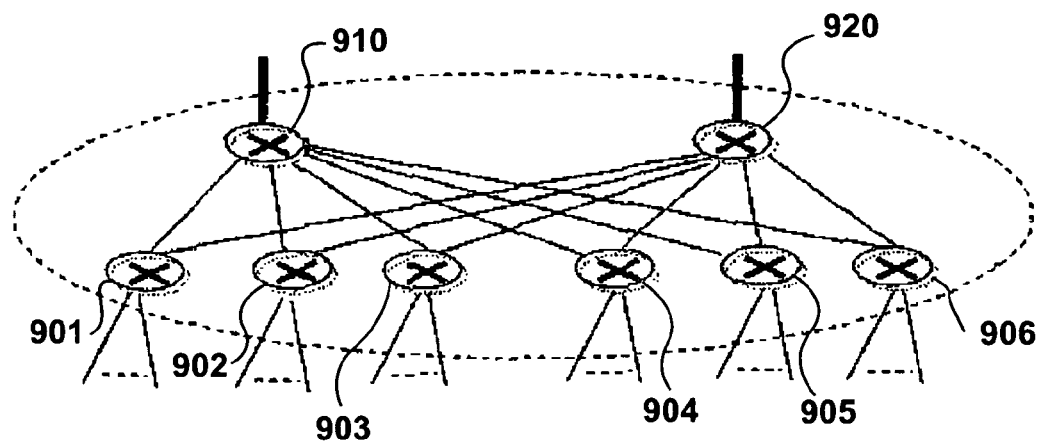
FIG. 9(a) and FIG. 9(b) are schematic representations of a fourth alternative network typology of FIG. 5 with internal routers linking to another backbone network.
Figure 9B:
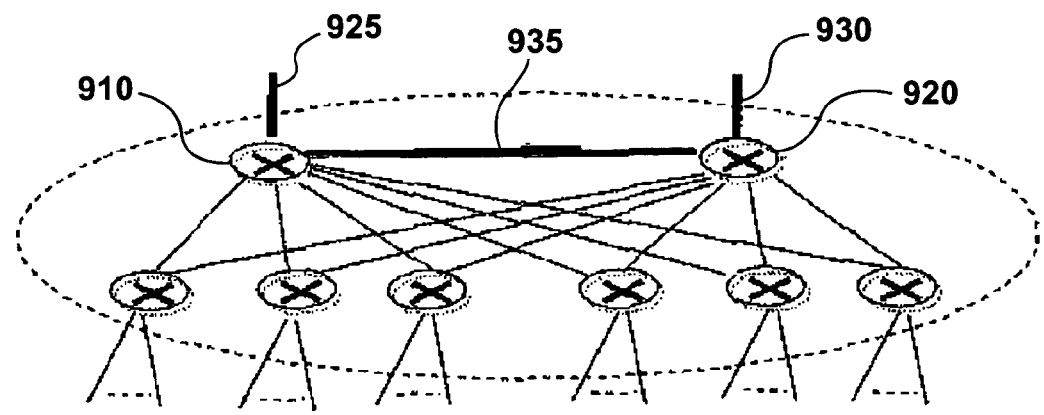

The fourth variation is that the internal routers can have links connected to outside routers, as shown in FIG. 9. The two internal routers 910 and 920 now have upper links 925 and 930 connected to the backbone networks to provide the double homing capability. So 910 and 920 also become edge routers in this network. For our discussion below, we call routers 910 and 920 the upper routers, and the other routers the lower routers. Traffic from one upper router will only goes to the lower routers, not to the other upper router. This means that traffic from uplink 925 will only go to the customers at the bottom, and not to the other uplink 930. This configuration is commonly used by ISPs for its distribution network.

To make the network nonblocking, we add a link, link 935, between the two internal routers 910 and 920. Traffic sent from lower links will be evenly distributed to the two upper routers, and 50% of the traffic coming from one of the two upper routers will be sent to the other upper router and then sent to the lower destination router. Assume that all internal links have the capacity 1. Then the amount of admissible traffic of each lower router will be 2. If we set the capacity of the middle link to m, then admissible amount of traffic in each upper router will be m as well.

The foregoing description of the invention has been presented for purposes of illustration and description. It is not intended to be exhaustive or to limit the invention to the precise embodiments disclosed. For example, the method, system, and apparatus described above for constructing a NBN is scalable.

This invention, for example, can be implemented in a network of routers including processor, an I/O bus, system memories, a CPU bus, and interface slots to connect to a variety of I/O devices, including storage devices, such as a removal disk drive.

When implemented in software, the elements of the present invention are essentially the code segments to perform the necessary tasks. The program or code segments can be stored in a processor readable medium or transmitted by a computer data signal embodied in a carrier wave over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Those skilled in the art will readily observe that numerous modifications and alterations of the device may be made without departing from the scope, spirit or teachings of the invention. The invention is defined by the following claims and their equivalents:

What I claim is:

1. A method, comprising:
    detecting, by a system including a processor, a setup packet of a set of flows associated with at least one of a transport layer of a transmission control protocol (TCP) flow or a session layer of a user datagram protocol (UDP) flow; and
    in response to detecting the setup packet, blocking, by the system, one or more additional flows of the at least one of the TCP flow or the UDP flow in response to a link utilization of the set of flows being determined to satisfy a predetermined criterion without reserving bandwidth for the one or more additional flows.

2. The method of claim 1, wherein the blocking the one or more additional flows further includes blocking the one or more additional flows in response to the link utilization being determined to satisfy the predetermined criterion without reservation for statistical multiplexing gains.

3. The method of claim 1, wherein the blocking the one or more additional flows further includes blocking a UDP packet of the UDP flow in response to the UDP flow being determined to not be associated with a flow entry of a table of existing flow entries of the transport layer or the session layer, and in response to the UDP flow being determined to not be associated with a session-layer setup packet.

4. The method of claim 1, further including admitting, by the system, a flow of the one or more additional flows into a symmetric network of a tree typology.

5. The method of claim 1, further including admitting, by the system, a flow of the one or more additional flows into a nonblocking network.

6. The method of claim 1, wherein the system includes an edge router.

7. The method of claim 5, wherein the nonblocking network includes an equal number of edge routers and internal routers, and wherein the edge routers are communicatively coupled to the internal routers utilizing links.

8. The method of claim 5, further comprising
    facilitating communicatively coupling an edge router to an internal router of the nonblocking network utilizing a link.

9. The method of claim 7, wherein a first edge router of the edge routers is associated with a first link capacity that is different from a second link capacity of a second edge router of the edge routers.

10. The method of claim 7, wherein
    an internal router of the internal routers is communicatively coupled, via a link, to a node that is outside of the nonblocking network.

11. An apparatus comprising:
    a memory that stores computer-executable instructions;
    a processor, communicatively coupled to the memory, that facilitates execution of the computer-executable instructions to at least:
        detect a setup packet of a set of flows of at least one of a transport layer for a transmission control protocol (TCP) flow or a session layer for a user datagram protocol (UDP) flow; and
        block, based on detection of the setup packet, a flow of one or more additional flows of the at least one of the transport layer or the session layer in response to a determination that a link utilization for the set of flows satisfies a predetermined criterion without reservation of bandwidth for the one or more additional flows.

12. The apparatus of claim 11, wherein the processor further facilitates the execution of the computer-executable instructions to:
    admit the flow of the one or more additional flows into a symmetric network associated with a tree typology.

13. The apparatus of claim 11, wherein the processor further facilitates the execution of the computer-executable instructions to:
    admit the flow of the one or more additional flows into a nonblocking network.

14. An apparatus, comprising:
    a memory to store instructions; and a processor, communicatively coupled to the memory, that facilitates execution of the instructions to perform operations, comprising:

detecting a setup packet of a flow of a symmetrical network;

in response to the detecting the setup packet, determining whether a link utilization associated with the flow satisfies a predetermined criterion without reserving bandwidth for another flow of the symmetrical network; and controlling the other flow in response to determining that the link utilization satisfies the predetermined criterion without reserving bandwidth for another flow of the symmetrical network.

15. The apparatus of claim 14, wherein the controlling the other flow further comprises:

storing a table of flow entries associated with the flow; and controlling the other flow in response to determining that the other flow is not associated with a flow entry of the flow entries.

16. The apparatus of claim 14, wherein the controlling the other flow further comprises:

storing a table of flow entries associated with the flow; and controlling the other flow in response to determining that the other flow is not associated with a session-layer setup packet.

17. The apparatus of claim 14, wherein the controlling the other flow further comprises:

admitting the other flow into the symmetrical network, wherein the symmetrical network includes a tree typology.

18. The apparatus of claim 14, wherein the controlling the other flow further comprises:

admitting the other flow into a nonblocking network.

19. The apparatus of claim 14, wherein the controlling the other flow further comprises:

admitting the other flow into a nonblocking network that includes one or more internal routers with links to one or more nodes outside of the symmetrical network.

20. The apparatus of claim 14, wherein the detecting the setup packet further includes detecting the setup packet using edge routers.

* * * * *